United States Patent [19]
Berger et al.

[11] Patent Number: 5,859,177
[45] Date of Patent: Jan. 12, 1999

[54] PROCESS FOR SUBSEQUENT CONDENSATION OF POLYCONDENSATES, IN PARTICULAR OF POLYAMIDE 6.6

[75] Inventors: Luzius Berger, Kriens; Hans Stehr, Adligenswil, both of Switzerland; Niklaus Zemp, Albi, France

[73] Assignee: Rhodia Filtec AG, Emmenbruecke, Switzerland

[21] Appl. No.: 945,930

[22] PCT Filed: Dec. 27, 1995

[86] PCT No.: PCT/CH95/00307

§ 371 Date: Aug. 26, 1997

§ 102(e) Date: Aug. 26, 1997

[87] PCT Pub. No.: WO97/24389

PCT Pub. Date: Jul. 10, 1997

[51] Int. Cl.$^6$ .......................... C08G 69/28; C08G 69/46; C08J 3/00; C08J 5/00
[52] U.S. Cl. .......................... 528/310; 528/312; 528/322; 528/332; 528/335; 528/336; 528/340
[58] Field of Search .................................. 528/310, 332, 528/335, 336, 322, 312, 340

[56] References Cited

FOREIGN PATENT DOCUMENTS

0092898 A2   3/1983   European Pat. Off. .

*Primary Examiner*—P. Hampton-Hightower
*Attorney, Agent, or Firm*—Michael J. Striker

[57] ABSTRACT

The process for single-stage postcondensation of a polycondensate in a fluidized bed reactor (1) includes feeding the polycondensate through the fluidized bed reactor (1); circulating a main stream of nitrogen carrier gas through the fluidized bed reactor; withdrawing a fractional stream at a temperature of from 20° to 230° C. from the main stream of the nitrogen carrier gas; passing the fractional stream through a water-filled gas scrubber column (15) so as to form a conditioned stream of the nitrogen carrier gas with a predetermined dew point between 10° to 80° C.; and returning the conditioned stream to the main stream. In preferred embodiments the polycondensate is allowed to cool during a cool-down stage at an end of the postcondensation and the withdrawal of the fractional stream from the main stream is halted, but the circulating of the main stream through the fluidized bed reactor is continued during the cool-down stage.

6 Claims, 1 Drawing Sheet

PROCESS FOR SUBSEQUENT CONDENSATION OF POLYCONDENSATES, IN PARTICULAR OF POLYAMIDE 6.6

BACKGROUND OF THE INVENTION

The invention relates to a process for single-stage postcondensation of polycondensates, especially polyamide 6.6 granulate, in a fluidized bed reactor using nitrogen ($N_2$) as the carrier gas.

For producing filaments of polycondensates for industrial yarns, a thermal posttreatment in the solid state, generally known as postcondensation, is required in order to adjust the degree of polymerization. In the postcondensation of polyamide 6.6, the polyamide is typically treated with heat in a vacuum in granulate form, or an inert gas, as a rule dry nitrogen, is passed through the granulate. Some of the inert gas, laden with moisture and contaminants, is blown off after passing through the granulate bed. Dessicators, such as deep-freeze traps, silica gel, or molecular sieves, are often located in the inert-gas loop in order to dry the polymers. All the known processes for postcondensation of polyamide 66 require very long postcondensation times, as a rule more than 20 hours.

In postcondensation in the solid state, as a rule one begins with granulate that is not completely dry. Adjusting the moisture in a polyamide granulate by adding water is known. For instance, in the process of European Patent Disclosure EP-A 0 092 898, postcondensation is first done in at least two stages, and then in a conditioning phase a regulated quantity of water is added to the polyamide immediately before the melting in the extruder. With the known process, the water content in the polymer is meant to be adjusted as accurately as possible before the extrusion. However, adding water in metered fashion to the cooled granulate or to the hot extruder has the disadvantage that the metered dosage can fluctuate, or undesired temperature fluctuations can occur. As a rule, fractional streams pass from the extruder to a plurality of stations whose operation has to be stopped, for instance for changing spinning nozzles, thus necessitating a complicated adaptation of the metered addition of water. Both manual addition and metering using a pump are too inaccurate to prevent deviations in the quality of the resulting filament.

SUMMARY OF THE INVENTION

The object of the invention is to remove the water, which is contained in the prestored polymer and escapes from the polymer as a result of heating of the granulate, in a simple way.

Another object is to remove the reaction water thus produced.

A further object is to give the cooled polymer a certain predetermined moisture content. Thus by means of the invention, adding water upstream of the extruder can be eliminated.

Still another object is for the moisture content to be adjustable within wider ranges.

Another object is to remove the monomers, oligomers and contaminants contained in the carrier gas.

A further object is to prevent unnecessary consumption of nitrogen that would be used in order to replace moist nitrogen with dry nitrogen.

The objects of the invention are attained according to the invention in that a fractional stream of the carrier gas at a temperature of 20° to 230° C. is withdrawn from the main stream and passed through a gas scrubber column, filled with water, such that the fractional stream of conditioned carrier gas is returned to the main stream of the carrier gas with a dew point of 10°–80° C., (100% relative humidity).

A considerable advantage here is considered to be that when the hot fractional stream of carrier gas is introduced into the water upon cooling down, first all the components in the water, such as oligomers, that can condense out and resublimate are separated out. At the same time, the temperature of the thus-purified carrier gas is automatically predetermined by the temperature of the water in the scrubber column, and thus the dew point of the reflux to the reactor can be adjusted very accurately as well (saturation). The dew point in the reactor itself adapts to the head temperature of the scrubber as the process time increases.

This has the further particular advantage that the regulation can be accomplished very simply. In the fluidized bed reactor itself, the moisture content of the granulate can be controlled in a very simple way via the dew point, during the entire postcondensation process, under constant pressure conditions.

As the carrier gas enters the gas scrubber column at a temperature of 20° to 230° C., preferably 40°–200° C., the gas is cooled down and gives off extraneous substances, such as monomers and oligomers, troublesome in the melt spinning process. The emerging, purified carrier gas, saturated with water vapor, has a temperature upon leaving the gas scrubber column of 10°–80° C., in particular 13°–40° C., and preferably 13–30° C., which in each case agrees numerically with the dew point.

In order for the hot polymer granulate to be capable of absorbing the desired quantity of water once the postcondensation is concluded, measured in terms of the relative viscosity of the polymer, the delivery of carrier gas from the conditioned fractional stream is interrupted during the cooling-down phase of the granulate in the fluidized bed reactor, and only the main stream continues to be circulated with the heating shut off or while being cooled. Once the desired discharge temperature is reached, the moisture content of the polymer has already adjusted so quickly that the granulate can be discharged immediately. The final moisture content of the granulate preferably amounts to 0.03 to 0.07%, as a function of the applicable dew point of 0.025 to 0.08%. Whatever moisture content is desired in the granulate can be regulated in this way very precisely via the dew point.

It has surprisingly been found that the granulate moisture content at the end of the postcondensation process, in other words after the cooling phase, depends only on the dew point in the carrier gas at the onset of the cooling phase. The dew point in turn depends only on the conditions in the gas scrubber column, and in particular on the scrubber temperature.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
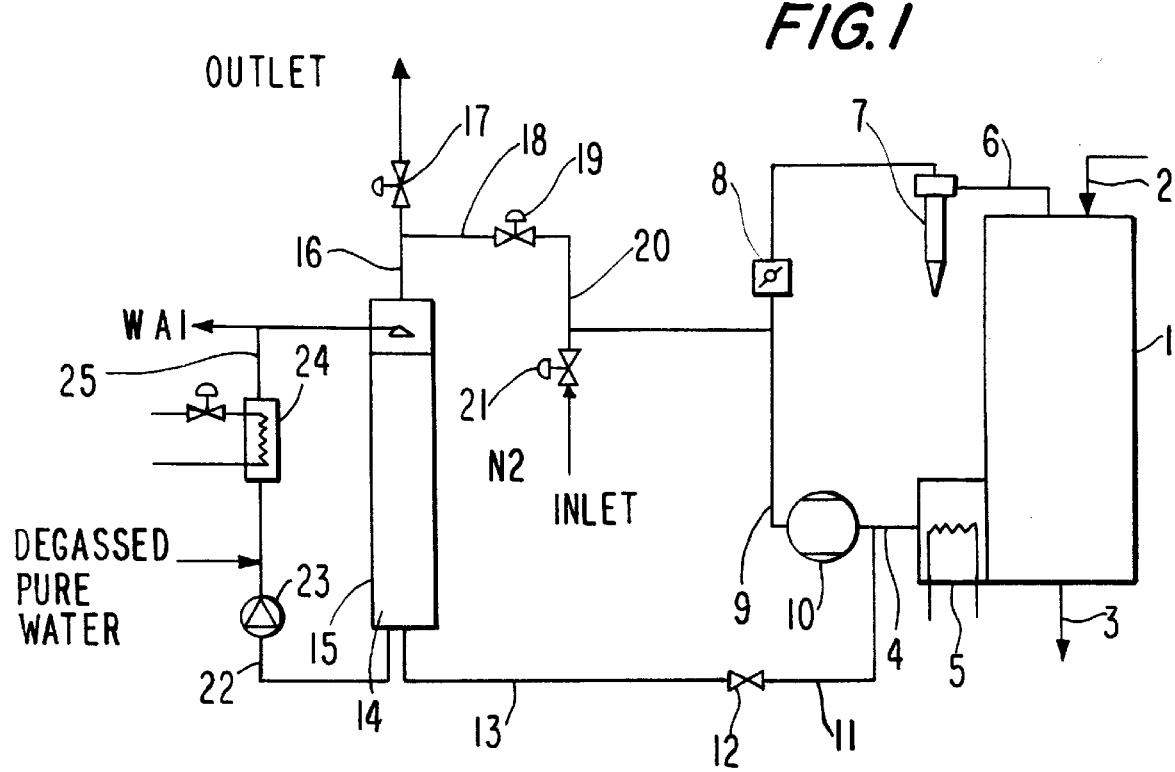
FIG. 1 is a schematic diagram of a plant for performing the process according to the invention.

In FIG. 1, reference numeral 1 designates a fluidized bed reactor. The fluidized bed reactor 1 is provided with a feed opening 2 for the polymer to be treated and a discharge opening 3 for the post-condensed polymer. In the lower portion of the fluidized bed reactor 1, a pressure line 4 is provided for delivering a carrier gas via a heat exchanger 5. The carrier gas leaves the fluidized bed reactor 1 in its upper portion via a pipeline 6 and a cyclone separator 7. Between a pipeline segment 9 and the heat exchanger 5, a fan 10 is installed. A further line 11 discharges into the pressure line 4 and leads via a valve 12 into a line segment 13, which with a gas distributor 14 discharges at its lower end in a gas scrubber column 15. The gas scrubber column 15, in its upper portion, has a line 16 that is closed off by a regulating valve 17. A line segment 18 leads from the line 16 via a further regulating valve 19 and a line 20 into the pipeline segment 9 of the carrier gas stream. A regulating valve 21 for adding nitrogen is provided in the line 20. The gas scrubber column 15 includes a temperature-regulatable coolant loop comprising a lower pipeline 22, a pump 23, a heat exchanger 24, and an upper pipeline 25.

Figure 2:
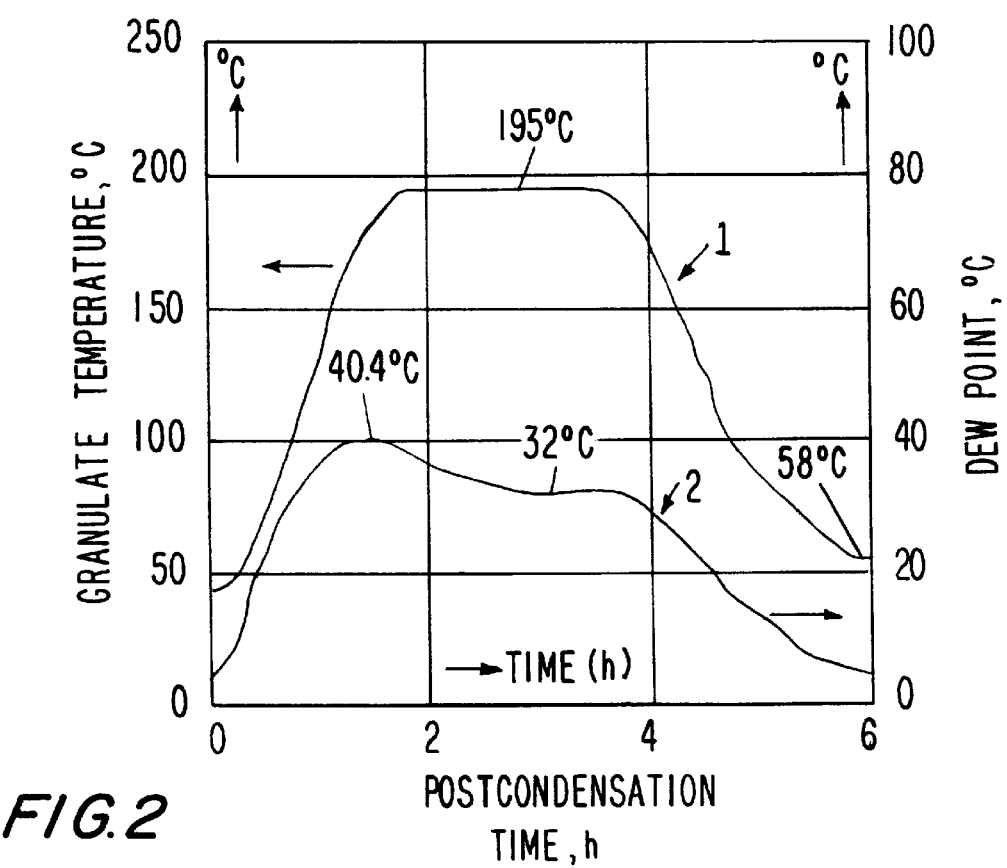
FIG. 2 is a graphical illustration of the course of the postcondensation and cool down according to the method of the invention.

FIG. 2 shows the behavior or the course of the granulate temperature and of the dew point during the heating, postcondensation and cooling down by the method of the invention. The curves show the granulate temperature and the dew point of a postcondensation batch with a desired dew point of 32° C., during the high-temperature phase until the discharge of the granulate. For the sake of simplicity, the ordinate on the left applies to curve 1 and the ordinate on the right to curve 2. Curve 1 represents the granulate temperature, and curve 2 shows the course of the dew point temperature. It can be seen from the curves that shortly before the granulate has reached its maximum temperature of 195° C., the dew point has already exceeded its highest point of approximately 40° C., and subsequently decreases and then continues practically constant until the onset of the cooling down phase.

In operation, the fluidized bed reactor 1 is charged with polyamide 6.6 granulate with a maximum water content of 0.4%. As a result of the heating, the moist granulate polymer gives off water, causing the dew point of the carrier gas to rise. This can cause the dew point of the carrier gas to be too high at first. If that is the case, then water is extracted from the main circulation loop by means of the gas scrubber column. The fluidized bed is created by recirculating carrier gas; the fan 10 blows the carrier gas at an overpressure via the heat exchanger 5 through the screen bottom, not shown, of the fluidized bed reactor 1 and the granulate. The pressure decreases downstream of the cyclone separator 7, which also is approximately equivalent to the pilot pressure of the fan 10. At the same time, a fractional stream of the carrier gas, which is at a temperature of approximately 190° C., is withdrawn from the pressure line 4 and delivered via the lines 11 and the line segment 13 to the gas distributor 14. The gas distributor 14 feeds gas into the water contained in the gas scrubber column. In the process, the carrier gas is cooled down from 190° C., for example, to 40° C. The temperature of the water in the gas scrubber column 15 is controlled via the heat exchanger 24, and the water is drawn from the gas scrubber column via the pipeline 22 by means of the pump 23, passed through the heat exchanger 24, and resupplied to the gas scrubber column 15 in the upper portion via the pipeline 25 and a sprayer. In the gas scrubber column 15, monomers and oligomers are separated out. The conditioned carrier gas leaves the gas scrubber column 15 at between 13° and 40° C. via the line 16, and is returned to the main loop, that is, the line 9 upstream of the fan, via the line 20.

EXAMPLE 1

4000 kg of polyamide 6.6 granulate are heated in a reactor with a total volume of 90 m³ to 195° C. with fluidizing, in accordance with the time course shown in FIG. 2. A fractional stream of the carrier gas is then passed through the gas scrubber column, the water temperature being 32° C. The process temperature is maintained for approximately 2 h, during which time the dew point comes to have the desired value of 32° C. The fractional stream is now stopped and cooled down. During the cooling phase, the water contained in the nitrogen is absorbed by PA 6.6. After the cooling-down phase, the final moisture content in the granulate is 0.055%, with an accuracy of better than 0.003%.

EXAMPLE 2

In Example 2, the same quantity of polyamide 6.6 granulate is heated to 189° C. with fluidizing, in accordance with a similar time course to that of FIG. 2. During the constant high-temperature phase, the dew point fluctuates until it assumes the desired value, specified by the scrubber temperature, of 13° C. After that, cooling is done. The result is a final moisture content in the granulate of 0.033%, with an accuracy of better than ±0.003%. The results are summarized in the following table.

TABLE

| Test No. | Dew Point [°C.] | Relative viscosity [RV] | Moisture content [%] |
| --- | --- | --- | --- |
| 1 | 13.0 | 75.6 | 0.033 |
| 2 | 13.0 | 93.5 | 0.026 |
| 3 | 25.0 | 76.0 | 0.045 |
| 4 | 32.0 | 75.6 | 0.055 |
| 5 | 38.0 | 91.5 | 0.070 |

It can be seen from the table that the moisture content in the granulate can be controlled within wide limits in a simple way by way of the dew point. The viscosity, conversely, is varied by means of the course of the granulate temperature over time.

By the method of the invention, it is possible for the first time to carry out the postcondensation and conditioning (adjusting the desired moisture content in the granulate) in one process step. Both the gaseous byproducts that occur in the postcondensation and dust particles are removed from the process continuously in a simple way. In particular, a uniform distribution of the moisture in the granulate is attained merely by adjusting the moisture level at high temperatures. Furthermore, considerable economies in terms of operating costs are attained by reducing the nitrogen, as carrier gas, continuously, so that only slight losses, which can occur from leaks and temperature effects, have to be covered.

By means of the invention, a plurality of process steps with regard to the water balance in the polymer are achieved simultaneously during the postcondensation. As a result, it is not only possible to dispense with adding water upstream of the extruder, but the process steps of postcondensation, drying, moisture conditioning of the granulate, and sometimes removal of contaminants, are also performed simultaneously. This makes it possible to economize considerably on the quantity of nitrogen. Overall, with the invention, the entire process is made more efficient and economical.

We claim:

1. A process for single-stage postcondensation of a polycondensate in a fluidized bed reactor (1), said process comprising the steps of:

a) feeding the polycondensate through the fluidized bed reactor (1);

b) circulating a main stream of nitrogen carrier gas through the fluidized bed reactor;

c) withdrawing a fractional stream at a temperature of from 20° to 230° C. from the main stream of the nitrogen carrier gas;

d) passing the fractional stream through a water-filled gas scrubber column (15) so as to form a conditioned stream of the nitrogen carrier gas with a predetermined dew point between 10° to 80° C.; and e) returning the conditioned stream to the main stream.

2. The process as defined in claim 1, further comprising allowing the polycondensate to cool during a cool-down stage at an end of the postcondensation and halting the withdrawal of the fractional stream from the main stream, but continuing the circulating of the main stream through the fluidized bed reactor during the cool-down stage.

3. The process as defined in claim 1, further comprising controlling a final moisture content of the polycondensate discharged from the fluidized bed reactor by means of the predetermined dew point and measuring said moisture content of said polycondensate to an accuracy of better than ±0.003%.

4. The process as defined in claim 1, wherein the polycondensate comprises polyamide 6.6 granulate.

5. The process as defined in claim 1, further comprising heating the main stream immediately prior to feeding the main stream into the fluidized bed reactor during the circulating.

6. The process as defined in claim 1, further comprising controlling a temperature in the water-filled gas scrubber column to control said dew point.

* * * * *